United States Patent [19]

Bachman

[11] 4,185,279
[45] Jan. 22, 1980

[54] MOTION DETECTOR

[75] Inventor: Wesley J. Bachman, Auburn, Ill.

[73] Assignee: Dickey-john Corporation, Auburn, Ill.

[21] Appl. No.: 806,746

[22] Filed: Jun. 15, 1977

[51] Int. Cl.² .......................... G01P 3/48; G08B 21/00
[52] U.S. Cl. .................................. 340/671; 324/167; 324/174; 340/62
[58] Field of Search ............... 340/271, 62, 670, 671, 340/540; 324/161, 167, 173, 174

[56] References Cited

U.S. PATENT DOCUMENTS

| 3,182,498 | 5/1965 | Koletsky et al. | 73/178 |
| 3,614,615 | 10/1971 | Cass | 324/161 |
| 3,701,015 | 10/1972 | Dittman | 324/174 |
| 3,721,968 | 3/1973 | Gee | 340/670 X |
| 3,732,494 | 5/1973 | Dragon | 324/173 |
| 3,890,517 | 6/1975 | Marsh et al. | 310/168 |

Primary Examiner—John W. Caldwell, Sr.
Assistant Examiner—Joseph E. Nowicki
Attorney, Agent, or Firm—Trexler, Wolters, Bushnell & Fosse, Ltd.

[57] ABSTRACT

A detector for a movalbe member such as a rotatable shaft includes a sensor and an alarm having a normal and a signaling condition. The sensor includes one or more magnetic pole pieces attached to the shaft whose rotational speed is to be detected, to rotate in unison therewith, and a pick-up including a coil mounted adjacent the shaft for producing an electrical signal in response to the rotating magnetic pole pieces. An electrical circuit is provided, connected between the coil and the alarm for switching the alarm between its normal and signaling conditions in response to a predetermined value of the electrical signal. The position of the coil with respect to the shaft and magnetic pieces is adjustable for selectively producing the predetermined switching value of the electrical signal in response to different rotational speeds of the shaft.

13 Claims, 4 Drawing Figures

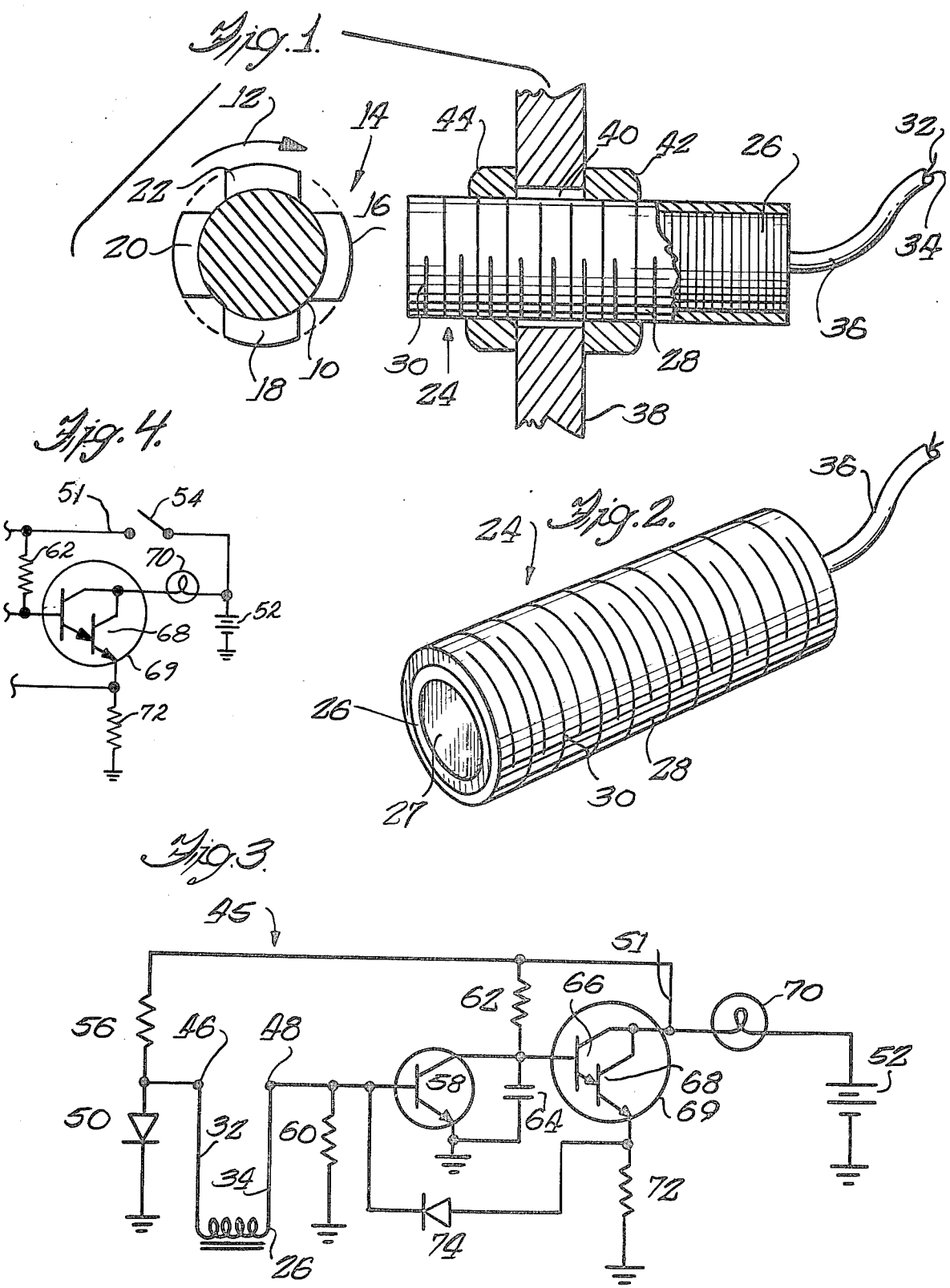

MOTION DETECTOR

BACKGROUND OF THE INVENTION

This invention relates to a detector for providing an indication of the rate of movement of a movable member and the disclosure will be facilitated by particular reference to detecting rotational speed of a rotatable shaft. In many types of machines, apparatus and systems, it is necessary or desirable to monitor the rotational speed of a shaft or the like and to provide for an alarm that produces a signal when the rotational speed departs from a preselected range. For example, in some machines it is desirable to provide an alarm or other suitable indication to the operator when the speed of the shaft drops below a preselected amount. In agricultural equipment such as combines, planters and the like, the detection and signaling to the operator of a slow down of the speed of a shaft is important so that potential trouble can be detected and remedied before more serious difficulties or breakdown occur.

OBJECTS AND SUMMARY OF THE INVENTION

It is a general object of the present invention to provide a detector for providing an indication of the speed of movement of a movable which is adapted to produce a first indication when the speed is within a desired preselected range, and a second indication when the speed departs from desired preselected range.

A more specific object of this invention is to provide a detector for giving an indication of the rotational speed of a rotatable body which is adapted to produce a first indication when the rotational speed is at or above a preselected level and a second indication when the rotational speed is below a preselected level.

Another object of this invention is to provide a detector in accordance with the foregoing objects which is further adapted to selectively vary the aforementioned preselected levels of rotational speed at and above which said first indication is given and below which said second indication is given.

Briefly, in accordance with one form of the invention, a detector or monitor is installed on a machine having a shaft, the rotational speed of which is to be detected and indicated. Sensor means includes magnet means attached to the shaft to rotate in unison therewith and pick-up means including coil means mounted adjacent the shaft and magnet means for producing an electrical signal in response to the magnet means. The electrical signal varies systematically in accordance with the rotational speed of the shaft. Alarm means are provided and circuit means are connected between the coil means and alarm means for switching the alarm means between a normal and a signaling condition in response to predetermined values of the electrical signal. Adjusting means are provided for selectively adjusting the sensor means for producing the predetermined values of the electric signal in response to different rotational speeds of the shaft.

The foregoing, as well as other objects and advantages of the invention will be appreciated from the following detailed description, together with the accompanying drawings wherein like reference numerals are used throughout to designate like elements and components.

BRIEF DESCRIPTION OF THE DRAWINGS

FIG. 1 is a side elevational view, somewhat diagrammatic in form, of a rotatable shaft together with a portion of the detector of the present invention;

FIG. 2 is a perspective view of a portion of the detector of the present invention; and FIG. 3 is a schematic circuit diagram of the circuit portion of the detector according to the invention.

FIG. 4 is a schematic circuit diagram of an alternate embodiment of a portion of the circuit of FIG. 3.

DETAILED DESCRIPTION

Referring to FIG. 1, a rotatable shaft 10 is rotatable in the direction indicated by the arrow 12. Sensor means designated generally 14 includes magnet means comprising a plurality of magnetic segments 16, 18, 20 and 22 attached to the shaft 10 to rotate in unison therewith and pick-up means designated generally 24 mounted adjacent the shaft 10. The magnetic segments 16, 18, 20 and 22 provide a plurality of discrete magnetic poles about the shaft and are preferably positioned at uniformly spaced apart locations. The magnetic segments 16 through 22 may comprise, for example, a number of discrete magnetic elements or alternatively, a strip of flexible magnetic material which can be magnetized and shaped to obtain predetermined magnetic pole configurations, such as the device described in U.S. Pat. No. 4,002,937 to Anson and assigned to the assignee of the present invention.

The pick-up means 24 includes a wire wound coil 26 having a solid core piece 27 therein, and mounted by suitable means in a housing 28, the housing 28 including a generally helical, screw-type thread 30 formed on an outer surface thereof. The coil 26 terminates in a pair of leads 32, 34 which form a cable 36 extending outwardly from the pick-up means 24 for suitable connections to the circuit portion of the detector, to be described below. A suitable bracket 38 is provided including an opening 40 therethrough, the pick-up means 24 being mountable through the opening 40. Suitable means such as nuts 42 and 44 are provided on either side of the opening 40 of the bracket 38 and are engageable with the thread 30 for adjusting the radial position of the pick-up means 24 including the coil 26 with respect to the shaft 10 and the magnets 16 through 22 mounted thereon.

It will be appreciated from the foregoing description, that as the shaft 10 rotates, the magnets 16 through 22 mounted thereon will induce an alternating electrical signal in the coil 26 mounted adjacent thereto. The frequency and amplitude of the electrical signal are determined primarily by the number of magnetic elements or poles attached to the shaft 10 and by the rotational speed of the shaft 10. The amplitude of the electrical signal may further be adjusted by varying the radial position of the pick-up means 24 including the coil 26 with respect to the shaft 10 and magnets mounted thereon. The thread 30 of the housing 28 is conjunction with suitable complimentary threaded means such as the nut 42 and 44 may be used to adjust the radial position of the pick-up means 24 including the coil 26.

Referring now to FIG. 3, an electrical circuit 45 suitable for use in a detector according to this invention is illustrated. The coil 26 is connected via the conductors 32 and 34 to a pair of terminals 46, 48 of the circuit 45. The terminal 46 is connected to the anode of a diode 50 whose cathode is connected to ground. A resistor 56 is connected between the terminal 46 and a line 51 which is connected to one side of a lamp 70, whose side is connected to a positive DC voltage supply 52. The terminal 48 is connected to the base electrode of a transistor 58 and to one end of a resistor 60 whose other end is connected to ground. The transistor 58 has its collector electrode connected via a resistor 62 to the line 51 at the junction of the lamp 70 with the resistor 56. A capacitor 64 is connected between the collector electrode of the transistor 58 and its emitter electrode which is connected to ground. A pair of transistors 66 and 68 are connected as a Darlington pair, the base electrode of the transistor 66 being connected to the collector electrode to transistor 58. The collector electrodes of the transistors 66 and 68 are connected together to the junction of the lamp 70 with the resistors 56 and 62 on the line 51. The emitter electrode of the transistor 66 is connected to the base electrode of the transistor 68, whose emitter electrode is connected via a resistor 72 to ground. A diode 74 has its anode connected to the junction of the emitter electrode of transistor 68 with the resistor 72, and its cathode connected to the base electrode of the transistor 58.

In operation, the diode 50 provides a DC bias or reference level at the end of the coil 26 at the terminal 46. In the first embodiment, it will be appreciated that state of the lamp 70 will determine the amount of current delivered via the resistor 56 to the diode 50, and therefore, determine the DC bias level at the terminal 46. The electrical signal induced in the coil 26 by the rotation of the shaft 10 and the magnetic elements 16 through 22 attached therto comprises an alternating electrical signal whose amplitude (and frequency) is proportional to the speed of rotation of the shaft 10. With the lamp 70 initially off, the capacitor 64 will begin to be charged via the resistor 62, the resistor 62 being large enough so that the voltage drop across the lamp 70 is not sufficient to light the lamp 70. As the capacitor 64 becomes charged, base current to the Darlington pair 69 will be provided thereby, turning on the Darlington pair 69 thereby lighting the lamp 70 connected to the collector electrode thereof. At the same time, however, if the signal at the terminal 48 from the coil 26 is high enough to turn on the transistor 58, the capacitor 64 will be discharged thereby, preventing the Darlington pair 69 from turning on and lighting the lamp 70. The signal level at the coil 26 required to turn on the transistor 58 depends on the reference level set therefor at the terminal 46 by the diode 50. The DC reference level at the diode 50, in turn, depends on the state of the lamp 70. This dependent condition then provides a positive feedback mechanism whereby the circuit exhibits a hysteresis characteristic, resulting in a clean transition of the lamp 70 between its on and off states, responsive to two different signal levels at the coil 26, corresponding to two different predetermined rotational speeds of the shaft 10.

In an alternate embodiment, as illustrated in FIG. 4, the line 51 is disconnected from the junction of the lamp 70 with the collector electrode of the Darlington pair 69, and reconnected to one side of a switch 54, whose other side is connected to the positive DC voltage supply 52. The remainder of this embodiment is identical to the circuit of FIG. 3.

In the second embodiment, the switch 54 must be closed to provide any current to the capacitor 64 or to the diode 50. Thus, with the switch 54 opened, the circuit 45 is effectively turned off, the lamp 70 being off regardless of the rotational speed of the shaft 10. With the switch 54 closed, a fixed bias level is supplied at the terminal 46, whereby the hysteresis effect of the first embodiment is eliminated. Thus, the capacitor 64 will charge, in the same manner described above, tending to turn on the Darlington pair 69, thereby lighting the lamp 70 connected at the collector electrode thereof, In this embodiment, however, as there is a single fixed bias level at the terminal 46, a single level of rotational speed of the shaft 10 will be required to turn on the transistor 58, regardless of whether the lamp 70 is lighted or not. Thus, the lamp 70 will be lighted when the rotational speed of the shaft 10 is below a single predetermined level, and the lamp 70 will be turned off when the rotational speed of the shaft 10 is above the same single predetermined level.

The resistor 72 and diode 74 connected from the emitter electrode of the Darlington pair 69 to ground and to the base electrode of the transistor 58, respectively, provide a current limiting function, should the junction of the lamp 70 with the collector electrode of the Darlington pair 69 become shorted to the positive voltage supply. This function is accomplished in both embodiments as follows. Since the emitter current of the Darlington pair 69 is essentially equal to its collector current, a voltage will be developed across the resistor 72 proportional to the collector current. Thus, should the collector become shorted to the positive voltage supply, a relatively higher than normal voltage will be developed across the resistor 72, sufficient to cause the transistor 58 to turn on, via the diode 74. This, then will turn off the Darlington pair 69 in the fashion previously described thus preventing any further increase in the collector current thereof.

As the amplitude of the signal at the terminal 48 is also variable in response to the relative position of the coil 26 with respect to the magnets on the shaft 10, it will be appreciated that varying the position thereof will effectively change the rotational speed necessary to produce a given signal at the terminal 48. Specifically, moving the coil 26 closer to the shaft 10 and magnets attached thereto, by use of the thread 30 of the housing 28 will cause a relatively higher value of the signal at the terminal 48 for a given rotational speed. That is to say, a relatively lower rotational speed of the shaft 10 will turn on the transistor 58. Similarly, positioning the coil 26 farther away radially from the shaft 10 and magnets attached thereto will mean that a relatively higher rotational speed of the shaft 10 will be required to produce a signal at the terminal 48 which will turn on the transistor 58.

Thus, the lamp 70 effectively serves as an alarm means, the circuit being adapted to switch the alarm means between a normal and a signaling condition. The normal condition corresponds to the lamp being off and the signaling condition to the lamp being lighted, as described above. It will be noted that the same predetermined values of electrical signals at terminal 48 comprise the switching points between the normal and signaling conditions of the lamp 70 in all cases. However, the rotational speed of the shaft 10 which will produce these predetermined values of electrical signal, can be varied by adjusting the position of the pickup means 24 with respect to the shaft 10 and magnets mounted thereon.

It will be appreciated that the present invention has many applications in addition to detecting the rotational speed of a shaft on a piece of machinery. For example, the shaft or other rotating body may be connected to a wheel or the like which is in turn rotated by virtue of being in contact with a moving object such as belt or chain, or to a wheel on a moving object in contact with the ground or other fixed surface.

Thus, the invention could be utilized to monitor the speed of a belt or other continuous moving body, or the speed of a vehicle or the like with respect to the ground or other fixed surface. Further, in an alternate embodiment, the core piece 27 of the coil 26 comprises a permanent magnet, whereby the pickup 12 is adapted to respond to any ferrous protrusion on a rotating body, for example, the teeth of a gear. In this embodiment, the magnets 16 through 22 are not needed, and may be replaced by one or more ferrous protrusions.

While a preferred embodiment has been shown and described herein, various changes and modifications may occur to those skilled in the art and will be understood as forming a part of the present invention insofar as they fall within the spirit and scope of the appended claims.

The invention is claimed as follows:

1. A motion detector for detecting the speed of a moving body comprising: sensor means including magnet means for attachment to said body to move in unison therewith and pickup means including coil means mounted adjacent said body for producing an electrical signal in response to movement of said magnet means, which electrical signal varies systematically in accordance with said speed of said body, said detector further comprising signal means, circuit means connected between said coil means and said signal means for switching said signal means between a normal and a signaling condition in response to at least one predetermined value of said electrical signal, and adjusting means for selectively adjusting the sensor means for producing said predetermined value of said electrical signal in response to different speeds of said body.

2. A motion detector according to claim 1 wherein said circuit means includes means for switching said signal means from said normal to said signaling condition in response to a first predetermined value of said electrical signal and for switching said signal means from said signaling to said normal condition in response to a second predetermined value of said electrical signal, in a hysteretic fashion.

3. A motion detector according to claim 2 wherein said adjusting means is further adapted for adjusting the sensor means for producing said first and second predetermined values in response to different speeds of said body.

4. A detector according to claim 1 wherein said pickup means further includes a generally cylindrical housing for containing said coil means and said adjusting means includes a thread formed on an outer wall of the housing for selectively adjusting the distance of said housing and coil means from said body and magnet means, said electrical signal varying systematically in accordance with the position of said coil means with respect to said magnet means.

5. A detector according to claim 4 wherein said adjusting means further includes bracket means mounted adjacent said body for holding said housing substantially in radial alignment with said body.

6. A detector according to claim 2 wherein said signal means comprises a lamp having two terminals and said normal and signaling conditions thereof comprise said lamp being off and said lamp being lighted, respectively, and said circuit means includes means for energizing said lamp to produce said signaling condition thereof.

7. A detector according to claim 6 wherein said energizing means includes positive voltage supply means connected with one terminal of said lamp, and switching means connected between the other terminal of said lamp and ground.

8. A motion detector for detecting the speed of a rotating body comprising: sensor means including magnet means for attachment to said body to rotate in unison therewith and pick-up means including coil means mounted adjacent said body for producing an electrical signal in response to rotation of said magnet means, which electrical signal varies systematically in accordance with said speed of said body, said motion detector further comprising signal means, circuit means connected between said coil means and said signal means for switching said signal means between a normal and a signaling condition in response to a first predetermined value of said electrical signal and for switching said signal means from said signaling to said normal condition in response to a second predetermined value of said electrical signal, in a hysteretic fashion, and adjusting means for selectively adjusting the sensor means for producing said first and second predetermined values of said electrical signal in response to different speeds of said body, and wherein said signal means comprises a lamp having two terminals and said normal and signaling conditions thereof comprise said lamp being off and said lamp being lighted, respectively, and said circuit means includes means for energizing said lamp to produce said signaling condition thereof, and said energizing means includes positive voltage supply means connected with one terminal of said lamp, and switching means connected between the other terminal of said lamp and ground, and said circuit means further includes current limiting means connected with said switching means for limiting the current flowing therethrough, should the junction of said lamp with said switching means become shorted to said positive voltage supply means.

9. A detector according to claim 8 wherein said circuit means comprises a first transistor connected in common emitter configuration and having a base electrode connected to one side of said coil means for switching said first transistor on and off in response to said predetermined values of said electrical signal, a diode having an anode connected to the other side of said coil and a cathode connected to ground, a capacitor load on said first transistor, second and third transistors connected as a Darlington pair, said Darlington pair having a base electrode, a collector electrode and an emitter electrode, said base electrode of the Darlington pair being connected to the collector electrode of said first transistor and said Darlington pair collector electrode being connected to one terminal of said lamp, said lamp having its other terminal connected to said positive voltage supply means, a first resistor connected between said collector electrode of said Darlington pair and said anode of said diode, and a second resistor connected between said collector electrode of said Darlington pair and said collector electrode of said first transistor.

10. A detector according to claim 9 wherein said current limiting means comprises a resistor connected between the emitter electrode of said Darlington pair and ground and a diode having an anode connected with said emitter electrode of said Darlington pair and a cathode connected to said base electrode of said first transistor.

11. A detector for providing an indication of the value of a function of an apparatus having a movable member whose speed is proportional to the value of the function to be detected, said detector comprising: sensor means including pick-up means mounted adjacent said movable member for producing an electrical signal in response to movement of said movable member, said electrical signal varying systematically in accordance with said speed of said movable member, said detector further comprising alarm means, circuit means connected between said coil means and said alarm means for switching said alarm means between a normal and a signaling condition in response to predetermined values of said electrical signal, and sensor means further including adjusting means for selectively adjusting the sensor means for producing said predetermined values of said electrical signal in response to different values of the function to be detected.

12. A detector according to claim 11 wherein said movable member comprises a substantially cylindrical body including at least one ferrous protrusion thereon, and said pickup means comprises coil means having core means therein, said core means comprising a permanent magnet.

13. A detector according to claim 11 wherein said movable member comprises a substantially cylindrical body, and said sensor means comprises magnet means attached to the circumference of said cylindrical body and said pickup means includes coil means.

* * * * *